(12) United States Patent
Toyama et al.

(10) Patent No.: US 10,048,143 B2
(45) Date of Patent: Aug. 14, 2018

(54) SENSOR UNIT AND MAGNETISM COLLECTING MODULE AND SENSOR APPARATUS

(71) Applicant: JTEKT CORPORATION, Osaka-shi, Osaka (JP)

(72) Inventors: Yuichi Toyama, Owariasahi (JP); Takatsugu Asano, Toyohashi (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/592,278

(22) Filed: May 11, 2017

(65) Prior Publication Data
US 2017/0336276 A1 Nov. 23, 2017

(30) Foreign Application Priority Data

May 19, 2016 (JP) ................................ 2016-100715

(51) Int. Cl.
*G01L 3/10* (2006.01)
*G01D 5/14* (2006.01)
*G01D 11/24* (2006.01)

(52) U.S. Cl.
CPC .............. *G01L 3/104* (2013.01); *G01D 5/145* (2013.01); *G01D 11/245* (2013.01)

(58) Field of Classification Search
CPC ............................ G01L 3/104; G01D 11/245
USPC .................................... 73/862.325, 862, 325
See application file for complete search history.

(56) References Cited

U.S. PATENT DOCUMENTS

| 5,627,464 A * | 5/1997 | Shinjo ..................... F01L 1/047 123/617 |
| 9,105,485 B2 * | 8/2015 | Tran ..................... H01L 25/0657 |
| 2002/0067162 A1 * | 6/2002 | Dammkohler ............ F02D 9/10 324/207.21 |
| 2003/0167857 A1 * | 9/2003 | Sugimura ............... G01L 5/221 73/862.333 |
| 2007/0295109 A1 * | 12/2007 | Tokumoto ......... B29C 45/14065 73/862.331 |
| 2011/0221432 A1 | 9/2011 | Oota |
| 2012/0038350 A1 | 2/2012 | Bender et al. |

(Continued)

FOREIGN PATENT DOCUMENTS

| EP | 2 833 110 A1 | 2/2015 |
| JP | 2010-271260 A | 12/2010 |
| JP | 2011-191094 A | 9/2011 |

OTHER PUBLICATIONS

Oct. 12, 2017 Search Report issued in European Patent Application No. 17171017.1.

*Primary Examiner* — Max Noori
(74) *Attorney, Agent, or Firm* — Oliff PLC

(57) ABSTRACT

A sensor unit and a sensor apparatus are provided in which the size of the sensor unit itself is prevented from varying regardless of whether or not a redundant sensor is included, eliminating the need to change the design of a component to which the sensor unit is attached. Terminals of a sensor unit include a plurality of lead connection portions to which Hall ICs can be attached and a plurality of cable connection portions electrically connected to outside. The terminals are provided according to the number of sensors so as to enable the Hall ICs corresponding to two magnetic sensors to be attached to the terminals. A lead to the Hall IC corresponding to at least one magnetic sensor is connected to the terminals.

6 Claims, 15 Drawing Sheets

(56) References Cited

U.S. PATENT DOCUMENTS

2012/0081109 A1    4/2012    Astegher et al.
2015/0033877 A1*    2/2015    Hotta .................. B62D 5/0481
                                                                   73/862.193

* cited by examiner

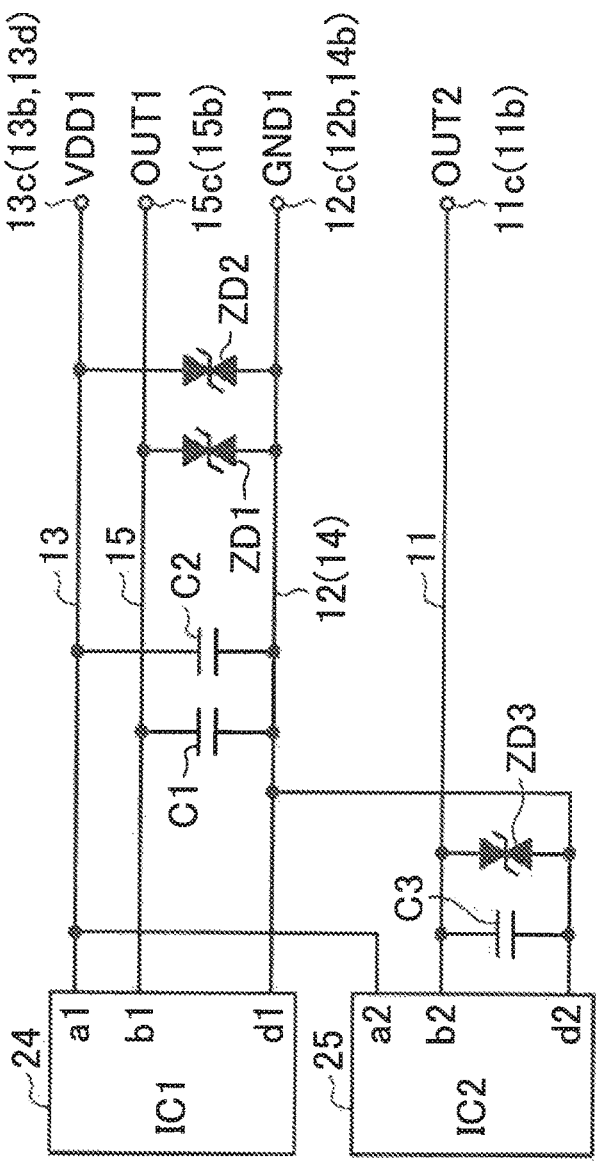
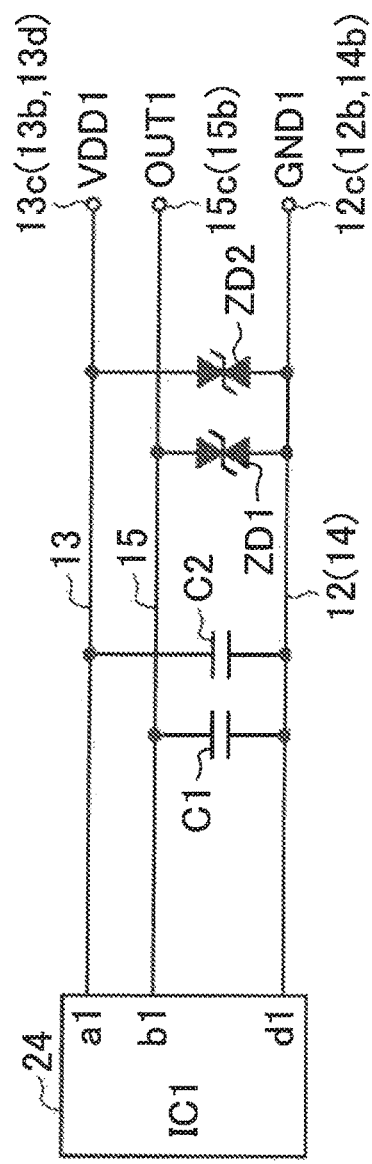
FIG. 3A
FIG. 3B

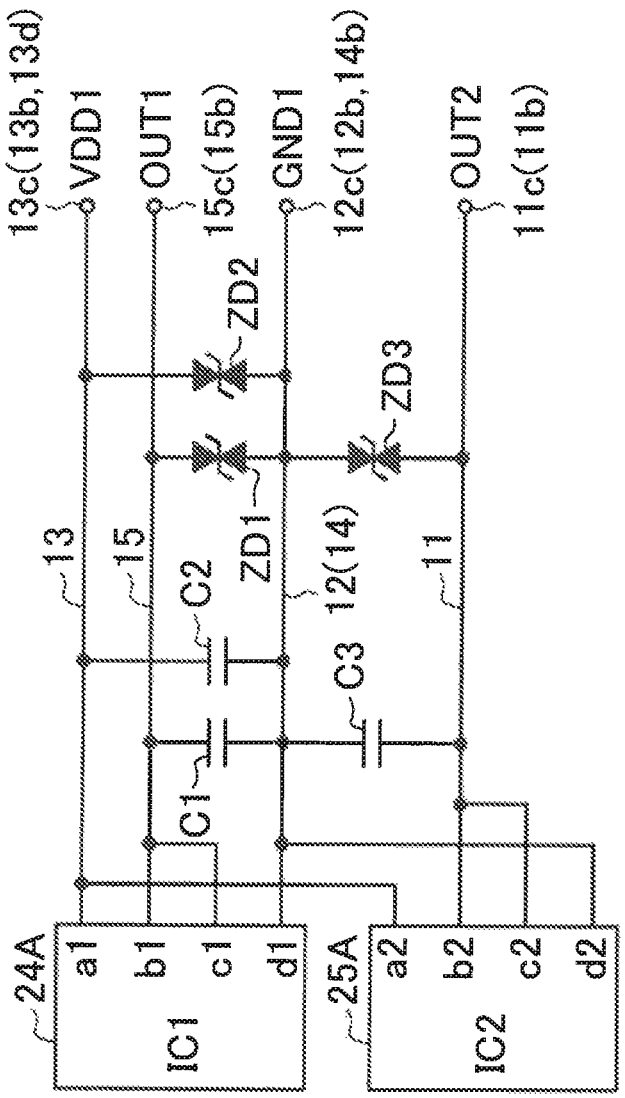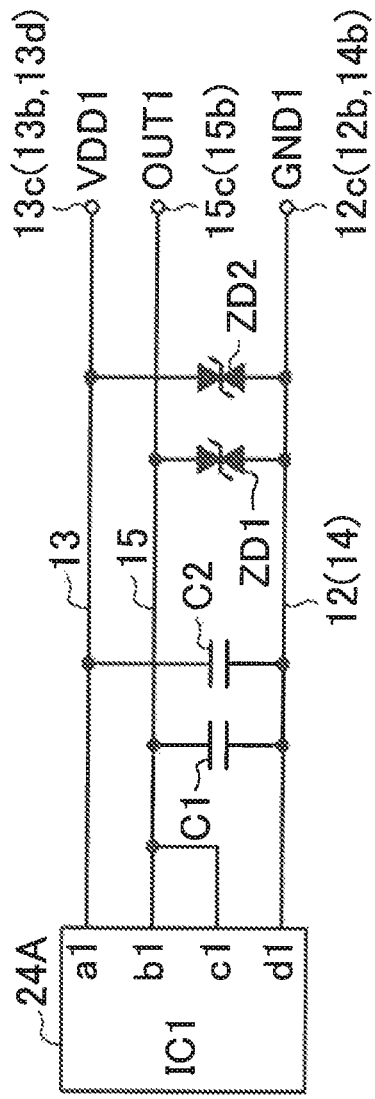
FIG. 6A
FIG. 6B

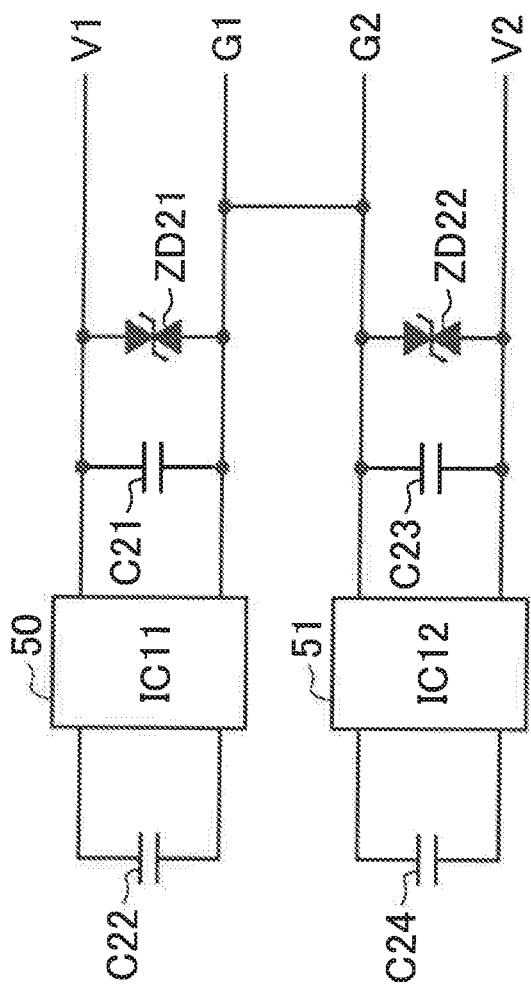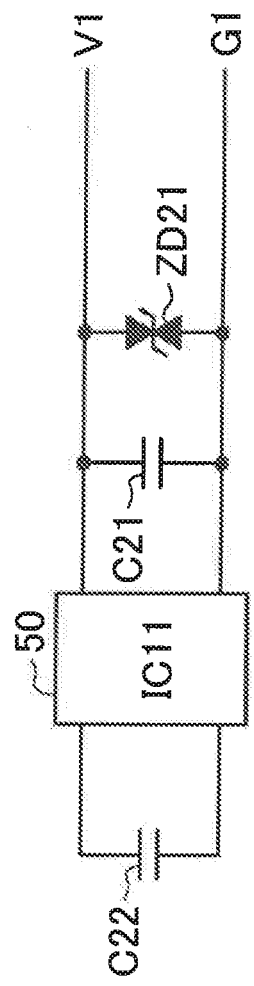
FIG. 14A
FIG. 14B

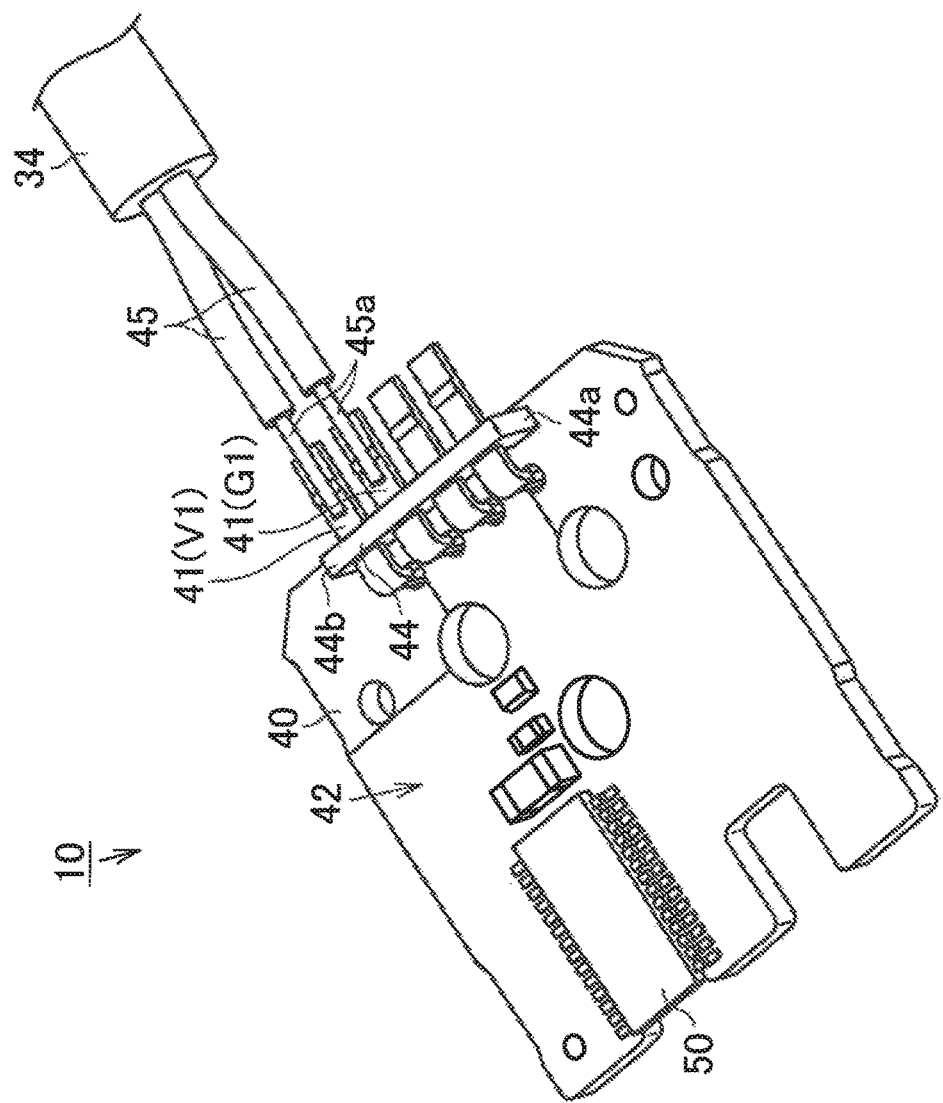

SENSOR UNIT AND MAGNETISM COLLECTING MODULE AND SENSOR APPARATUS

INCORPORATION BY REFERENCE

The disclosure of Japanese Patent Application No. 2016-100715 filed on May 19, 2016 including the specification, drawings and abstract, is incorporated herein by reference in its entirety.

BACKGROUND OF THE INVENTION

1. Field of the Invention

The invention relates to a sensor unit and a sensor apparatus.

2. Description of the Related Art

There has been a demand to provide redundant electric steering systems for automobiles in order to allow vehicles to be automatically driven. Many needs for manual driving of vehicles are still present. To meet both the need for automatic driving and the need for manual driving, two types of structures need to be prepared for torque sensor apparatuses: a structure including a redundant magnetic sensor and a structure including no redundant magnetic sensor, for example, a structure for manual driving.

Well known torque sensor apparatuses are disclosed in Japanese Patent Application Publication No. 2011-191094 (JP 2011-191094 A) and Japanese Patent Application Publication No. 2010-271260 (JP 2010-271260 A). The disclosure of the torque sensor apparatus in JP 2011-191094 A includes no discussion of a configuration with a redundant magnetic sensor and a configuration with no redundant magnetic sensor.

JP 2010-271260 A does not particularly refer to provision of a redundant magnetic sensor but discloses terminals for torque sensors that allow, when a plurality of magnetic sensors is installed, additional magnetic sensors to be provided without the need to add circuit boards. JP 2010-271260 A allows a torque sensor to be configured to include a plurality of units each including a magnetic sensor, a first to a third independent terminals connected to leads to the magnetic sensor, and a coupling member that couples the independent terminals together. The units are connected together via the coupling members to provide the torque sensor.

As described above, the disclosure in JP 2011-191094 A includes no discussion of a configuration with a redundant magnetic sensor and a configuration with no redundant magnetic sensor (that is, a non-redundant configuration). In JP 2010-271260 A, when a redundant magnetic sensor is provided, the corresponding configuration can be achieved by coupling a plurality of units together. However, when no redundant magnetic sensor is provided, a single unit is used. Then, the size of the sensor apparatus itself varies depending on whether or not a plurality of units is coupled together or a single unit is used. Thus, the design of, for example, a mating member to which the torque sensor apparatus is attached needs to be changed depending on whether a redundant or non-redundant configuration is used.

The sensor apparatuses including magnetic sensors have been described. However, sensor apparatuses having a sensor different from a magnetic sensor pose a similar problem concerning whether or not a redundant sensor is provided.

SUMMARY OF THE INVENTION

An object of the invention is to provide a sensor unit and a sensor apparatus in which the size of the sensor unit itself is prevented from varying regardless of whether or not a redundant sensor is provided, eliminating the need to change the design of a component to which the sensor unit is attached.

A sensor unit in an aspect of the invention includes a sensor that detects a physical quantity related to a detection object, a sensor connection member having at least a first connection portion to which a lead to the sensor is connected and a second connection portion electrically connected to the first connection portion and electrically connected to an outside of the sensor unit, and an electronic component provided in a circuit between the first connection portion and the second connection portion. The sensor connection member includes a plurality of the first connection portions and a plurality of the second connection portions so as to enable a plurality of the sensors to be attached to the sensor connection member, or a plurality of the sensor connection members is provided according to a number of the sensors so as to enable the sensors to be attached to the sensor connection members. A lead to at least one of the sensors is connected to the sensor connection members.

In this configuration, the sensor connection member is provided with the plurality of the first connection portions and the plurality of the second connection portions so as to enable a plurality of the sensors to be attached to the sensor connection member, or the sensor connection member is provided according to the number of the sensors so as to enable the sensors to be attached to the sensor connection members. Thus, the sensor connection member can accommodate both a configuration with a redundant sensor and a configuration with no redundant sensor.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 3A is an electric circuit diagram of the redundant sensor unit in the first embodiment;

FIG. 3B is an electric circuit diagram of a non-redundant sensor unit;

FIG. 6A is an electric circuit diagram of the redundant sensor unit in the second embodiment;

FIG. 6B is an electric circuit diagram of a non-redundant sensor unit;

FIG. 14A is an electric circuit diagram of the redundant sensor unit;

FIG. 14B is an electric circuit diagram of a non-redundant sensor unit; and

FIG. 15 is a perspective view of the non-redundant sensor unit.

DETAILED DESCRIPTION OF EMBODIMENTS

A sensor unit 10 in a first embodiment in which the invention is embodied will be described below with reference to FIGS. 1 to 3A.

Figure 1:
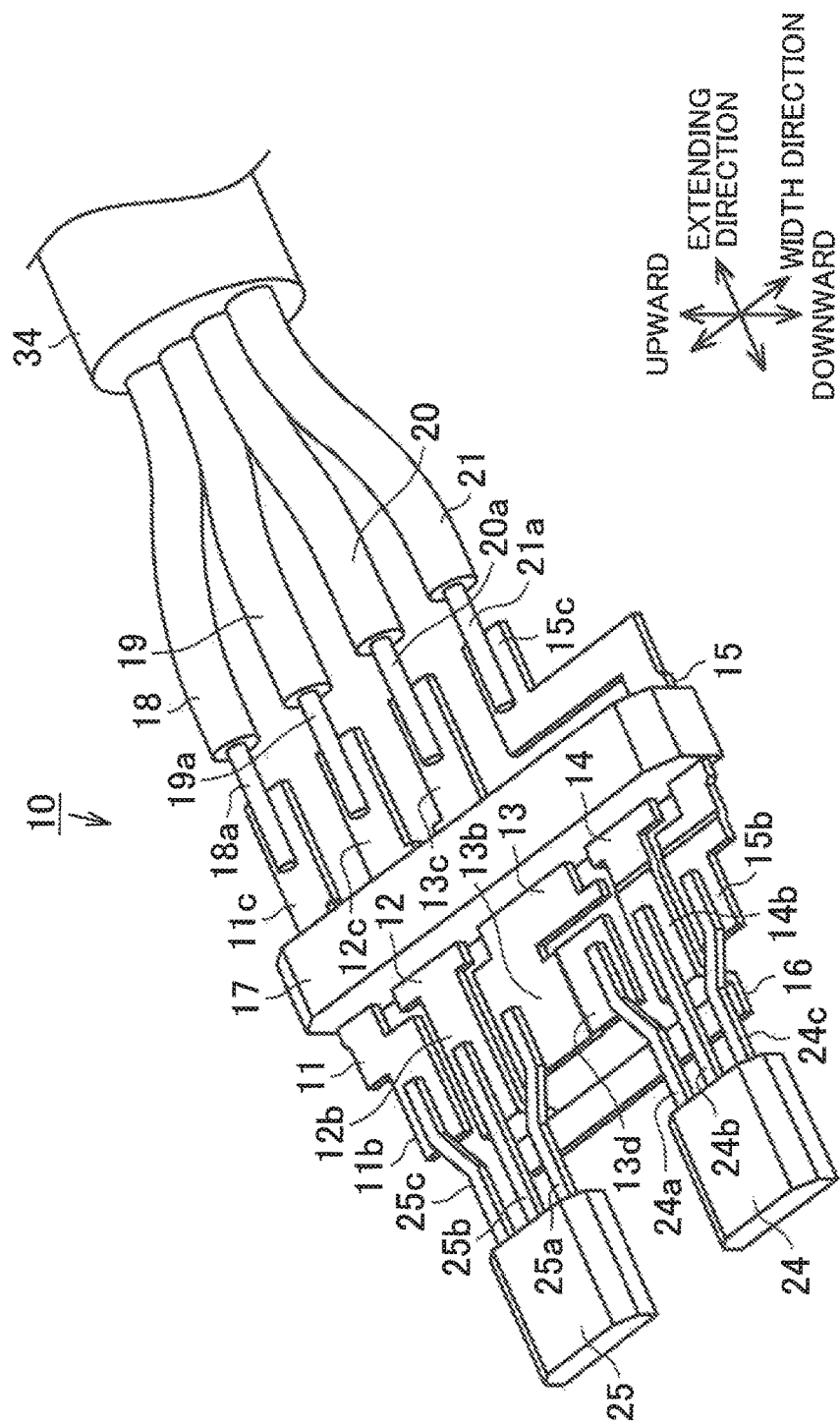
FIG. 1 is a perspective view of a redundant sensor unit in a first embodiment.

As depicted in FIG. 1, the sensor unit 10 has a plurality of terminals 11 to 15 arranged in parallel with one another, a coupling member 17 formed of a synthetic resin to couple the terminals 11 to 15 together, and Hall ICs 24, 25 electrically connected to the terminals 11 to 15 to serve as magnetic sensors. The terminals 11 to 15 correspond to sensor connection members. The terminals 11 to 15 are formed of a conductive material shaped like plates and have a predetermined strength needed to hold the sensor unit 10. The terminals 11 to 15 are formed, for example, by cutting out a copper plate.

The terminals 11 to 15 have main portions 11a to 15a, respectively, arranged substantially parallel to one another and positioned flush with the same virtual plane and lead connection portions 11b to 15b, respectively, located at tips of the terminals 11 to 15 so as to extend in an extending direction of the main portions 11a to 15a.

The lead connection portion 13b of the terminal 13 expands toward the terminal 14 in a width direction of the lead connection portion 13b to form a lead connection portion 13d. The lead connection portions 11b, 12b, 13b are flush with the same virtual plane similarly to the main portions 11a, 12a, 13a, whereas the lead connection portions 13d, 14b, 15b are positioned slightly above the virtual plane in an upward direction orthogonal to each of the extending direction and the width direction in FIG. 1 and FIG. 2 so as to form step portions.

The lead connection portion 11b of the terminal 11 is formed like a crank with respect to the main portion 11a and biased toward the adjacent terminal 12. The lead connection portions 11b, 12b, 13b, 13d, 14b, 15b correspond to first connection portions.

Opposite ends of a bridging piece 16 in the width direction are integrally coupled to the tip of the lead connection portion 12b of the terminal 12 and the tip of the lead connection portion 14b of the terminal 14, respectively, via step portions 16a, 16b extending downward. That is, the bridging piece 16 is formed to lie below the main portions 12a, 14a in a direction orthogonal to each of the extending direction and the width direction.

Figure 2:
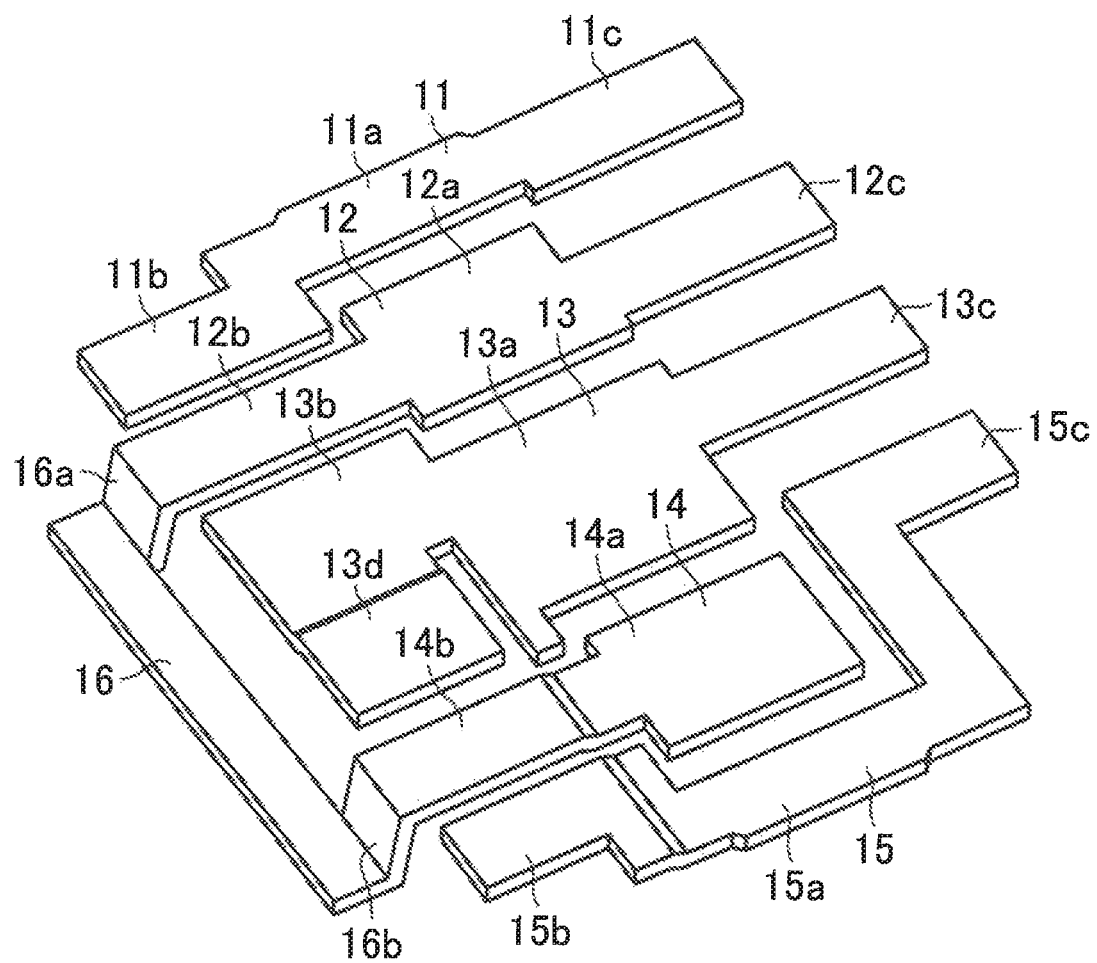
FIG. 2 is a perspective view depicting arrangement of connection terminals.

As depicted in FIG. 1 and FIG. 2, cable connection portions 11c to 13c, 15c extend from the main portions 11a to 13a, 15a of the terminals 11 to 13 and the terminal 15 toward a harness 34 to serve as second connection portions.

The cable connection portion 15c is formed like a crank with respect to the main portion 11a and biased toward the cable connection portion 13c.

As depicted in FIG. 1, a bare wire portion 18a of a signal cable 18 is connected to the cable connection portion 11c by welding or the like. A bare wire portion 19a of a ground cable 19 is connected to the cable connection portion 12c by welding or the like. A bare wire portion 20a of a power supply cable 20 is connected to the cable connection portion 13c by welding or the like. A bare wire portion 21a of a signal cable 21 is connected to the cable connection portion 15c by welding or the like. The harness 34 is a covered bundle of the signal cable 18, the ground cable 19, the power supply cable 20, and the signal cable 21.

As depicted in FIG. 3A, each of the Hall ICs 24, 25 has three ports, that is, the Hall ICs have power supply input ports a1, a2, ground ports d1, d2, and signal output ports b1, b2, respectively. As depicted in FIG. 1, leads 24a, 25a are connected to the power supply input ports of the Hall ICs 24, 25 and connected to the lead connection portions 13b, 13d, respectively, by soldering or the like. Leads 24b, 25b are connected to the ground ports of the Hall ICs 24, 25 and connected to the lead connection portions 12b, 14b, respectively, by soldering or the like. Leads 24c, 25c are connected to the signal output ports of the Hall ICs 24, 25 and connected to the lead connection portions 11b, 15b, respectively, by soldering or the like.

The coupling member 17 is formed to substantially entirely cover the main portions 11a to 15a of the terminals 11 to 15 by molding a synthetic resin, and in the coupling member 17, capacitors C1 to C3 and bi-directional Zener diodes ZD1 to ZD3 depicted in FIG. 3A are embedded. The capacitor C1 and the bi-directional Zener diode ZD1 illustrated in FIG. 3A are connected in parallel with each other between the main portion 15a of the terminal 15 and the main portion 14a of the terminal 14. The capacitor C2 and the bi-directional Zener diode ZD2 illustrated in FIG. 3A are connected in parallel with each other between the main portion 13a of the terminal 13 and the main portion 12a of the terminal 12. The capacitor C3 and the bi-directional Zener diode ZD3 illustrated in FIG. 3A are connected in parallel with each other between the main portion 11a of the terminal 11 and the main portion 12a of the terminal 12. The terminals 11 to 15, the Hall ICs 24, 25, and the coupling member 17 are connected together as described above to provide the sensor unit 10 having the circuit illustrated in FIG. 3A. The sensor unit 10 configured as described above has the pair of Hall ICs 24, 25 and is thus redundant, and is assembled into a magnetism collecting module described below.

Now, a variation with a non-redundant configuration will be described with reference to FIG. 3B and FIG. 4. The same components in FIG. 3B and FIG. 4 as the corresponding components in the embodiment with the redundant sensor are denoted by the same reference numerals and will not be described.

Figure 4:
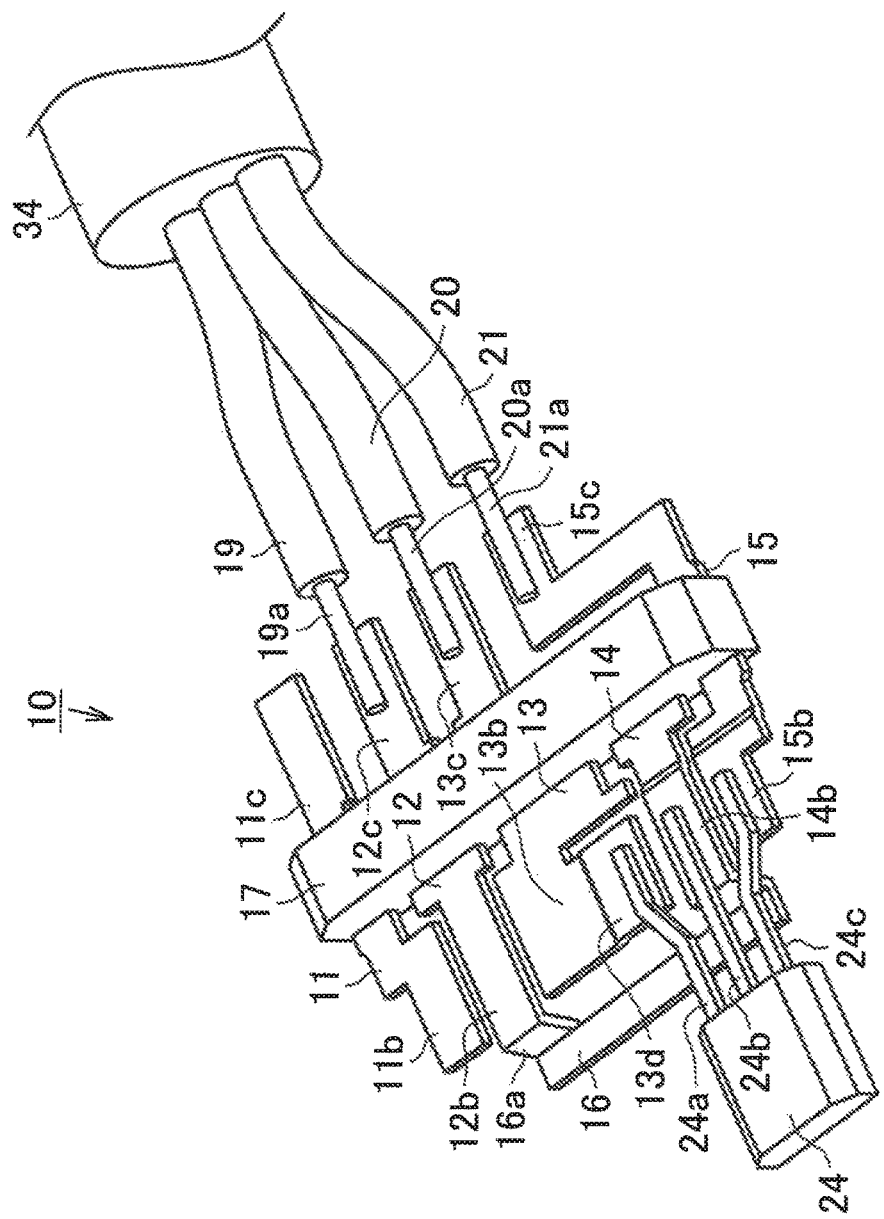
FIG. 4 is a perspective view of the non-redundant sensor unit.

When no redundant Hall IC is provided, the Hall IC 25 is omitted as depicted in FIG. 4 and the capacitor C3 and the bi-directional Zener diode ZD3 are omitted as illustrated in FIG. 3B. The rest of the configuration in the variation is similar to the corresponding part of the configuration in the embodiment with the redundant sensor.

The sensor unit configured as described above has the single Hall IC 24 and is thus non-redundant, and is assembled into the magnetism collecting module described below.

The present embodiment has the following features.

(1) In the sensor unit 10 in the present embodiment, the terminals 11 to 15, serving as the sensor connection members, are provided with the lead connection portions 11b, 12b, 13b, 13d, 14b, 15b (first connection portions) to which the Hall ICs 24, 25 (sensors) can be attached and the cable connection portions 11c to 13c, 15c (second connection portions) connected to the outside. The terminals 11 to 15 are provided according to the number of sensors so as to enable the Hall ICs 24, 25 corresponding to two magnetic sensors to be attached to the terminals 11 to 15. The leads to the Hall IC 24 corresponding to at least one magnetic sensor are connected to the terminals 11 to 15 (sensor connection members). Thus, the terminals 11 to 15 (sensor connection members) can accommodate both a configuration with a redundant sensor and a configuration with no redundant sensor.

(2) In the sensor unit 10 in the present embodiment, the sensor connection members are the terminals, and the terminals are provided according to the number of the Hall ICs 24, 25 corresponding to a plurality of magnetic sensors. Thus, in the sensor unit with the terminals, the terminals can accommodate both a configuration with a redundant sensor and a configuration with no redundant sensor.

(3) In the sensor unit 10 in the present embodiment, the sensors are Hall ICs. As a result, the sensor unit with the Hall ICs produces effects described in (1) and (2).

Now, a sensor unit 10 in a second embodiment will be described with reference to FIG. 5 and FIG. 6A. The present embodiment includes a redundant sensor. Components in the second embodiment that are the same as or correspond to particular components in the above-described embodiment are denoted by the same reference numerals and will not be described below. Parts of the configuration of the second embodiment different from the corresponding parts of the configuration of the above-described embodiment will be described.

In the present embodiment, the number of ports in the Hall ICs in the sensor unit 10 is different from the number of ports in the above-described embodiment. The second embodiment is the same as the above-described embodiment in the remaining parts of the configuration such as the terminals 11 to 15 and the coupling member 17. A Hall IC 24A in the present embodiment has four ports, the power supply input port a1, the ground port d1, and the signal output ports b1, c1, as depicted in FIG. 6A. A Hall IC 25A has four ports, the power supply input port a2, the ground port d2, and the signal output ports b2, c2, as depicted in FIG. 6A.

Figure 5:
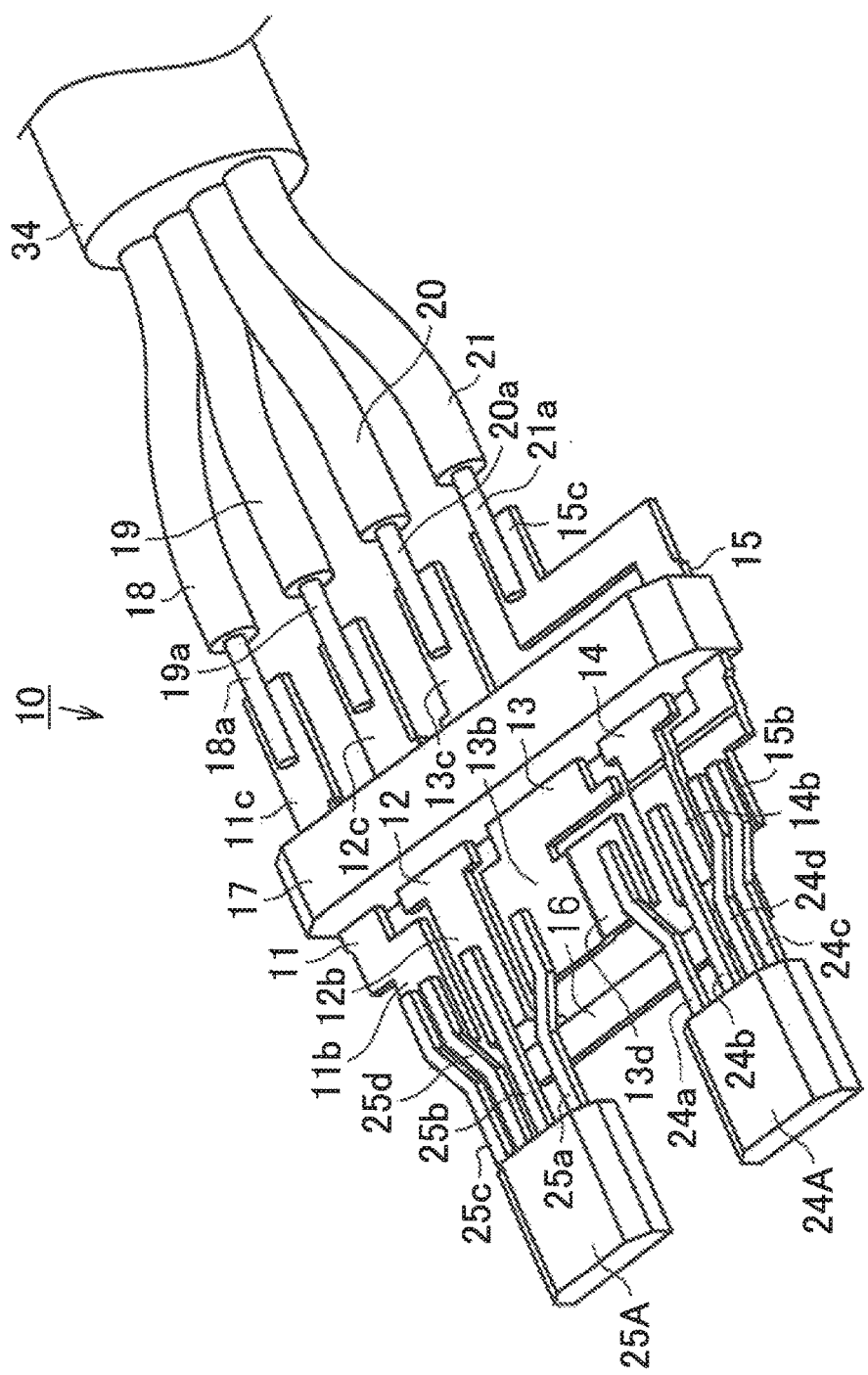
FIG. 5 is a perspective view of a redundant sensor unit in a second embodiment.

Leads 24c, 24d are connected to the signal output ports b1, c1 in the Hall IC 24A depicted in FIG. 6A, as illustrated in FIG. 5, and are connected to lead connection portion 15b by soldering or the like. Leads 25c, 25d are connected to the signal output ports b2, c2 in the Hall IC 25A depicted in FIG. 6A, as illustrated in FIG. 5, and are connected to lead connection portion 11b by soldering or the like.

Connections to the power supply ports a1, a2 and the ground ports d1, d2 are similar to the corresponding connections in the above-described embodiment and will not be described. In the present embodiment, the Hall ICs 24A, 25A transmit signals output from the signal output ports b1, c1, b2, c2 by serial communication or CAN communication and share each of the terminals 11, 15. The sensor unit 10 configured as described above has the pair of Hall ICs 24A, 25A and is thus redundant, and is assembled into the magnetism collecting module described below.

Figure 7:
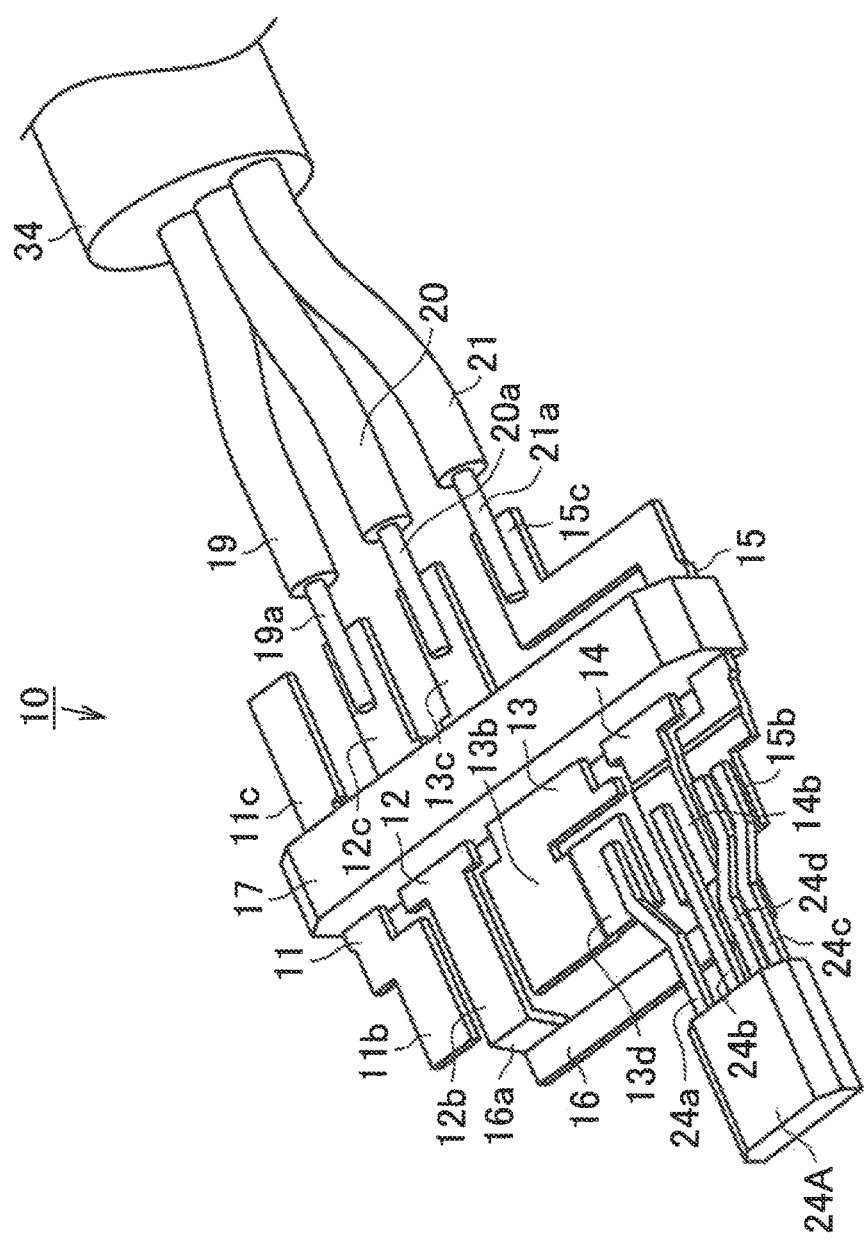
FIG. 7 is a perspective view of the non-redundant sensor unit.

Now, a variation with a non-redundant configuration will be described with reference to FIG. 6B and FIG. 7. The same components in FIG. 6B and FIG. 7 as the corresponding components in the embodiment with the redundant sensor are denoted by the same reference numerals and will not be described. When no redundant Hall IC is provided, the Hall IC 25A is omitted as depicted in FIG. 7, and the capacitor C3 and the bi-directional Zener diode ZD3 are omitted as illustrated in FIG. 3B. The rest of the configuration in the variation is similar to the corresponding part of the configuration in the embodiment with the redundant sensor.

The sensor unit 10 configured as described above has the single Hall IC 24A and is thus non-redundant, and is assembled into the magnetism collecting module described below. The present embodiment produces the effects (1) to (3) described in the first embodiment.

Now, with reference to FIGS. 8 to 12, a third embodiment will be described in which the sensor unit 10 is assembled in the magnetism collecting module used for a torque detecting apparatus serving as a sensor apparatus.

Figure 8:
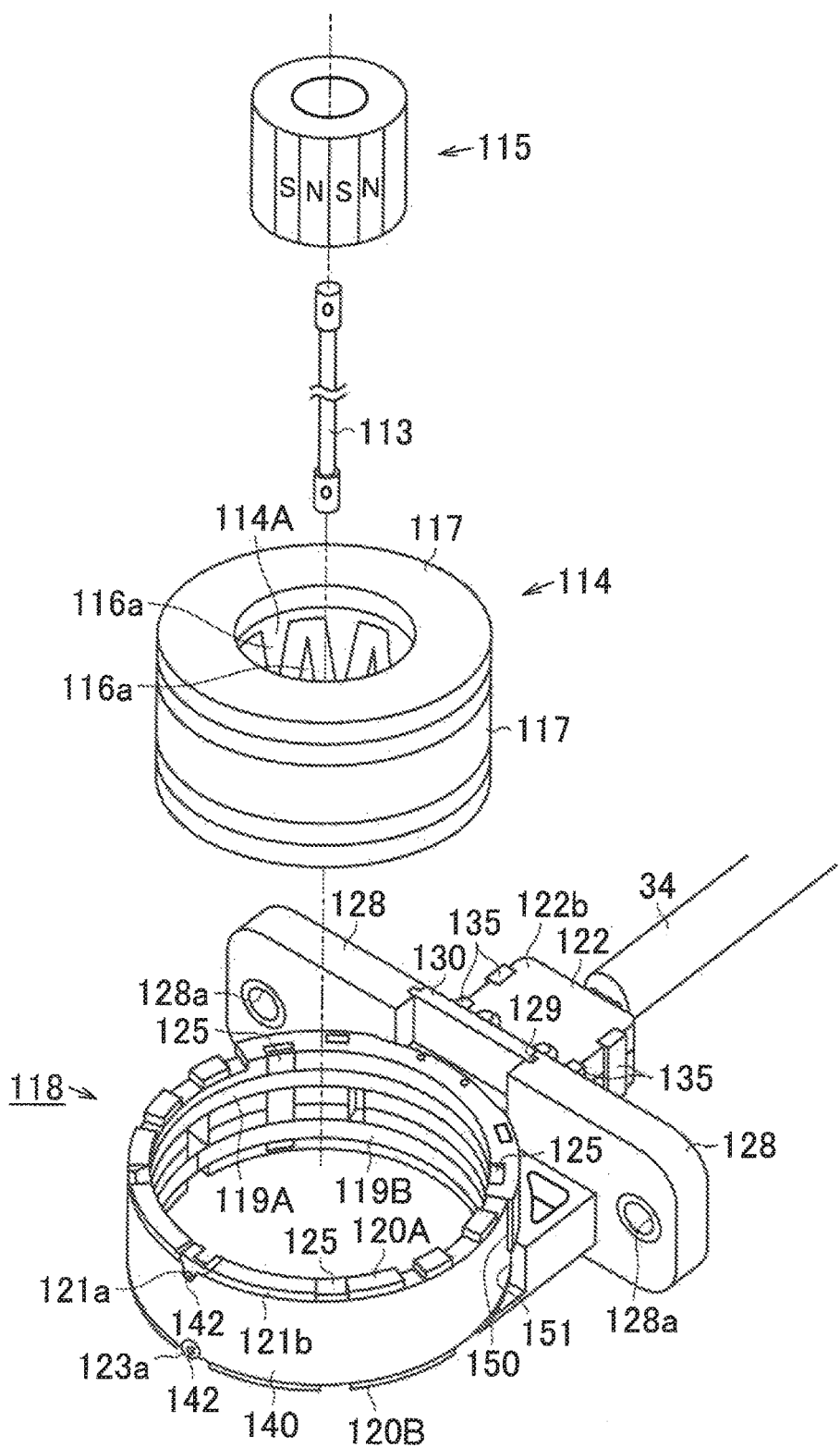
FIG. 8 is an exploded perspective view of a torque sensor in a third embodiment.
Figure 9:
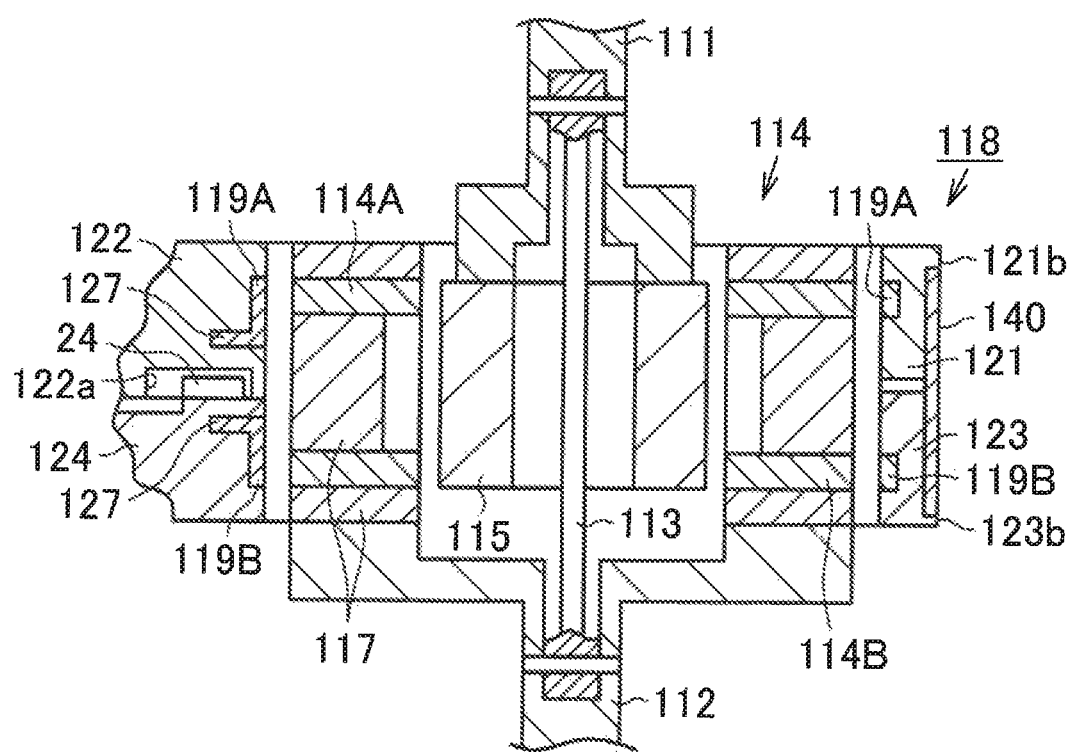
FIG. 9 is a longitudinal sectional view of the torque sensor and a magnetism collecting module in the third embodiment.

As depicted in FIG. 8 and FIG. 9, the torque detecting apparatus has a torsion bar 113 that couples an input shaft 111 and an output shaft 112 together, a permanent magnet 115 coupled to the input shaft 111, a yoke 114 coupled to the output shaft 112, and a tubular magnetism collecting module 118 arranged to surround the yoke 114. As depicted in FIG. 9, the torsion bar 113 is coaxially coupled to the input shaft 111 and the output shaft 112. As depicted in FIG. 9, the permanent magnet 115 coupled to the input shaft 111 is shaped like a cylinder magnetized to provide, for example, 24 poles (12 N poles and 12 S poles) arranged at regular intervals in a circumferential direction. The permanent magnet 115 is coaxially fixed to the input shaft 111. As depicted in FIG. 9, the cylindrical yoke 114 is coaxially fixed to the output shaft 112 and arranged so as to surround the permanent magnet 115 with an appropriate radial clearance between the yoke 114 and the permanent magnet 115.

Figure 12:
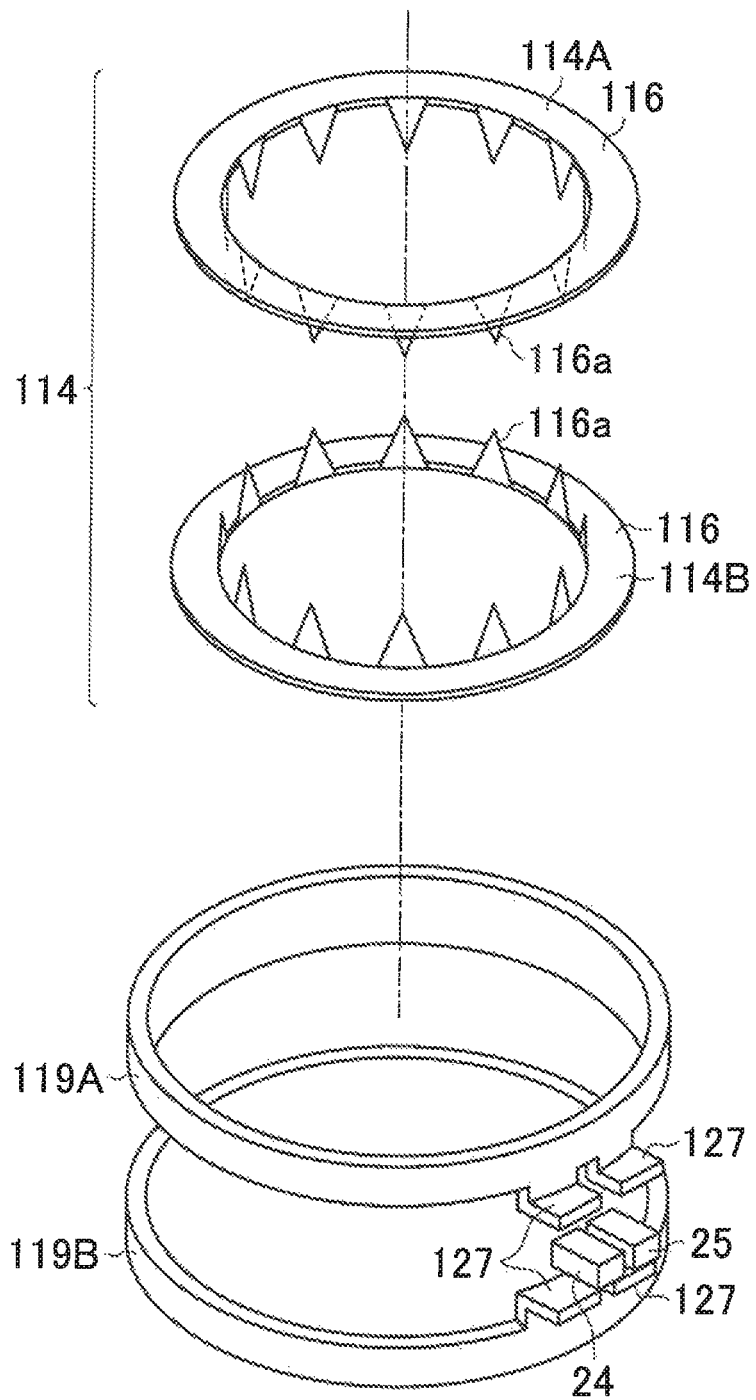
FIG. 12 is a diagram illustrating a configurational relation between magnetism collecting rings and sensors in the third embodiment.

As depicted in FIG. 9 and FIG. 12, the yoke 114 includes two magnetic yokes 114A, 114B (soft magnetic materials). Each of the magnetic yokes 114A, 114B includes a plate-like ring 116 with 12 pawls 116a arranged circumferentially at regular intervals on a plate surface of the ring 116. The pawls 116a are shaped like isosceles triangles and extend in a direction perpendicular to the plate surface. The magnetic yokes 114A, 114B are incorporated in a cylindrical synthetic resin body 117 through molding such that the pawls 116a of the magnetic yoke 114A face the pawls 116a of the magnetic yoke 114B so as to be shifted from the pawls 116a of the magnetic yoke 114B at appropriate intervals. As depicted in FIG. 8, surfaces of the magnetic yokes 114A, 114B that face the permanent magnet 115 are exposed from the synthetic resin body 117. The magnetic yokes 114A, 114B are arranged such that, in a neutral state where no torque is applied to the input shaft 111, a tip of each of the pawls 116a points to a boundary between the corresponding N and S poles in the permanent magnet 115. The permanent magnet 115 corresponds to a detection object of the Hall ICs 24, 25, and the magnitude of magnetic fields based on the permanent magnet 115 corresponds to the physical quantity of the detection object.

Figure 11:
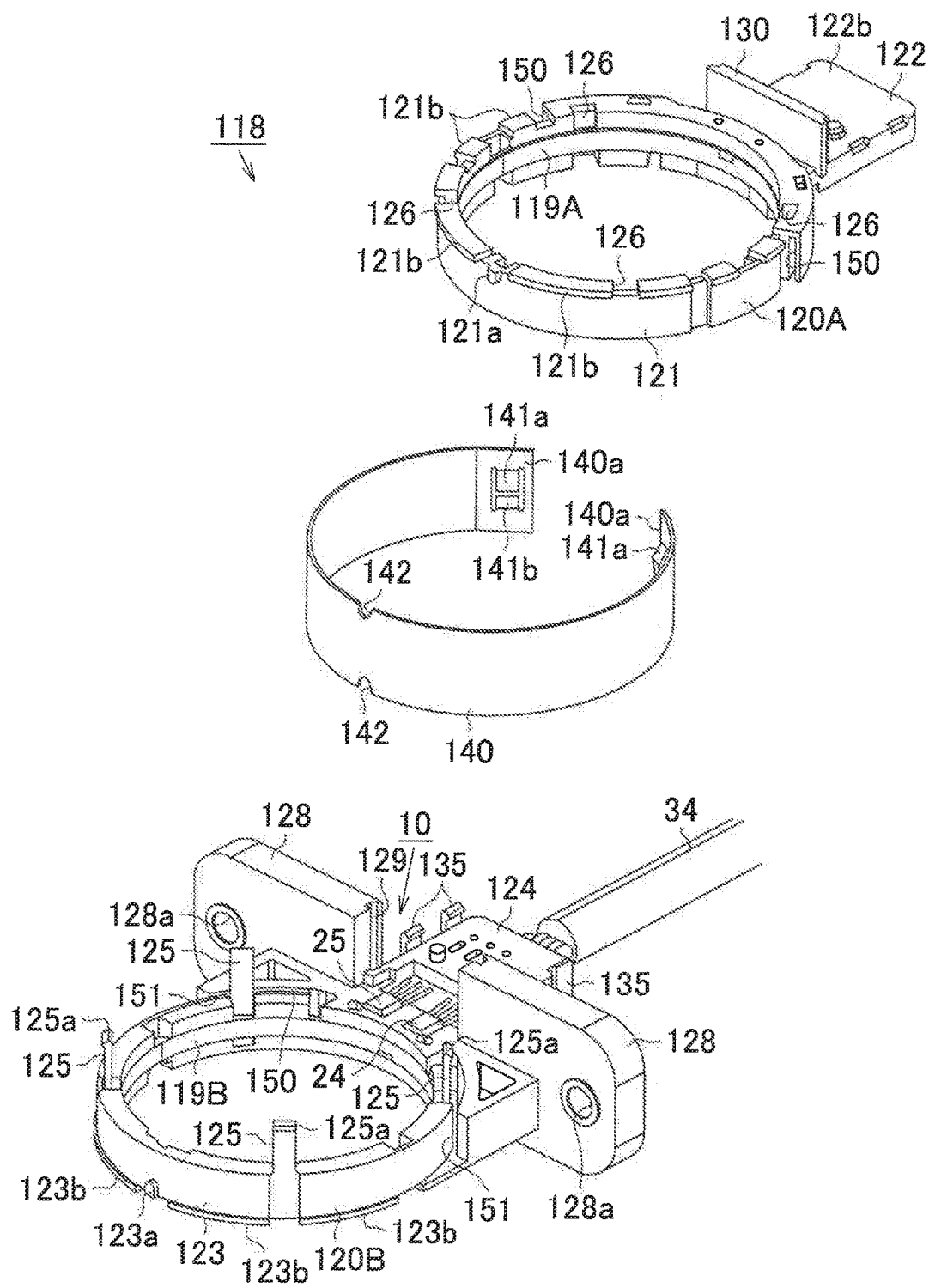
FIG. 11 is a perspective view of the magnetism collecting module in the third embodiment.

As depicted in FIG. 8, the magnetism collecting module 118 has two magnetism collecting rings 119A, 119B that are magnetic circuits magnetically coupled to the magnetic yokes 114A, 114B depicted in FIG. 12 to guide each of the magnetic fluxes from the magnetic yokes 114A, 114B to the sensor unit 10. The magnetism collecting module 118 includes a first holder 120A and a second holder 120B that hold the magnetism collecting rings 119A, 119B, respectively, and a magnetic shield 140 that covers a circumferentially outer side of each of the magnetism collecting rings 119A, 119B. The first holder 120A and the second holder 120B form a magnetism collecting holder. That is, the magnetism collecting holder includes the first holder 120A and the second holder 120B resulting from axial division of the magnetism collecting holder into two pieces. As depicted in FIG. 11, the first holder 120A is formed of a synthetic resin and has a ring portion 121 shaped like a circular ring and a circuit cover portion 122 shaped like a capped box and integrally coupled to an outer peripheral surface of the ring portion 121 so as to protrude outward in a radial direction. The magnetism collecting ring 119A is held in an inner peripheral surface of the ring portion 121 and arranged so as to face an outer peripheral surface of the yoke 114 as depicted in FIG. 9. The magnetism collecting ring 119A is formed of a soft magnetic material. That is, facing surfaces of the magnetic yoke 114A and the magnetism collecting ring 119A are exposed and arranged so as to face each other.

As depicted in FIG. 8 and FIG. 11, a periphery of an axial end of the ring portion 121 that is opposite to the second holder is provided with a protrusion 121a for positioning that protrudes outward in the radial direction and a plurality of flange pieces 121b. As depicted in FIG. 11, the second holder 120B is formed of a synthetic resin and has a ring portion 123 shaped like a circular ring and a sensor connection member placement portion 124 shaped like a rectangular plate and integrally coupled to an outer peripheral surface of the ring portion 123 so as to protrude outward in the radial direction. The ring portion 123 has an inner peripheral surface and an outer peripheral surface having the same diameters as those of the inner peripheral surface and the outer peripheral surface, respectively, of the ring portion 121 of the first holder 120A. The magnetism collecting ring 119B is held in the inner peripheral surface of the ring portion 123 and arranged so as to face the outer peripheral surface of the yoke 114 as depicted in FIG. 9. The magnetism collecting ring 119B is formed of a soft magnetic material. That is, facing surfaces of the magnetic yoke 114B and the magnetism collecting ring 119B are exposed and arranged so as to face each other.

As depicted in FIG. 11, the outer peripheral surface of the ring portion 123 of the second holder 120B is provided with a plurality of hooking protrusions 125 protruding toward the first holder 120A. The hooking protrusions 125 are fitted into respective fitting grooves 126 recessed in the inner peripheral surface of the ring portion 121 of the first holder 120A. Engaging pawls 125a at tips of the hooking protrusions 125 are hooked on an axial end surface of the ring portion 121 of the first holder 120A. Consequently, the hooking protrusions 125 are hooked on the ring portion 121 of the first holder 120A to arrange the second holder 120B coaxially with the first holder 120A. As depicted in FIG. 8 and FIG. 11, a periphery of an axial end of the ring portion 123 that is opposite to the first holder is provided with a protrusion 123a for positioning that protrudes outward in the radial direction and a plurality of flange pieces 123b.

As depicted in FIG. 8, the two magnetism collecting rings 119A, 119B are arranged parallel to each other and as depicted in FIG. 12, each have flat-plate-like protruding portions 127 such that the distance between the protruding portions 127 of the magnetism collecting ring 119A and the protruding portions 127 of the magnetism collecting ring 119B is shorter than the distance between the remaining part of the magnetism collecting ring 119A and the remaining part of the magnetism collecting ring 119B. One of the Hall ICs 24, 25 of the sensor unit 10 or the pair of Hall ICs 24, 25 is inserted into the clearance between the protruding portions 127 of the magnetism collecting rings 119A and the adjacent protruding portions 127 of the magnetism collecting ring 119B. The sensor unit 10 is held by the second holder 120B. A case with the single Hall IC 24 corresponds to a non-redundant configuration, and a case with the pair of Hall ICs 24, 25 corresponds to a redundant configuration. The case with the single Hall IC 24 and the case with the pair of Hall ICs 24, 25 are hereinafter collectively referred to as the Hall IC 24 or the pair of Hall ICs for convenience of explanation.

As depicted in FIG. 11, the sensor unit 10 is arranged on the sensor connection member placement portion 124. That is, the sensor connection member placement portion 124 is formed, by molding a resin, to accommodate the sensor unit 10 except for the Hall IC 24 or the pair of Hall ICs and the lead connection portions 11b to 15b, 13d. The circuit cover portion 122 is placed on the sensor connection member placement portion 124 to form a circuit housing chamber 122a between the circuit cover portion 122 and the sensor connection member placement portion 124 as depicted in FIG. 9. The Hall IC 24 or the pair of Hall ICs is housed in the circuit housing chamber 122a.

As depicted in FIG. 8 and FIG. 11, hooking protruding pieces 135 protruding toward the circuit cover portion 122 is provided on side surfaces of the sensor connection member placement portion 124. Engaging pawls provided at tips of hooking protruding pieces 135 are locked on edges of a top cover wall 122b of the circuit cover portion 122 to keep the circuit cover portion 122 laid on top of the sensor connection member placement portion 124.

Figure 10:
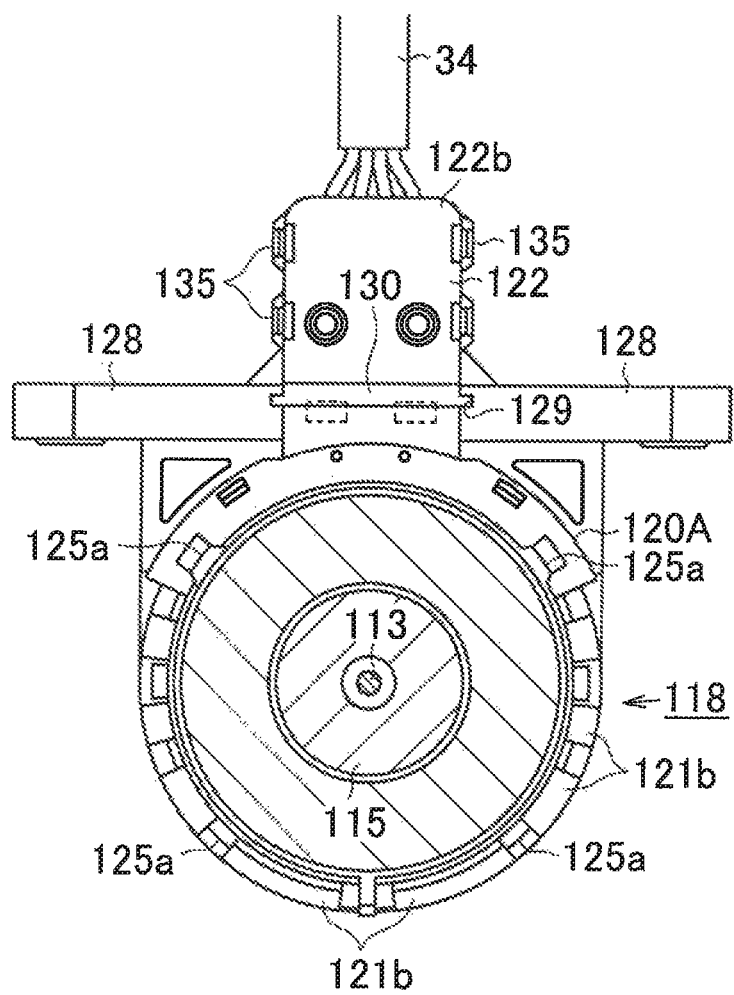
FIG. 10 is a plan view of the magnetism collecting module in the third embodiment.

As depicted in FIG. 8 and FIG. 11, a pair of flanges 128 is formed to sandwich opposite side surfaces of a base end of the sensor connection member placement portion 124 between the flanges 128. As depicted in FIG. 8 and FIG. 10, a base end of the circuit cover portion 122 is fitted into a clearance formed between the flanges 128.

A guide groove 129 is formed in each of facing end surfaces of the opposite flanges 128 so as to extend in a direction in which the circuit cover portion 122 is laid on top of the sensor connection member placement portion 124. A partition wall 130 formed on the circuit cover portion 122 like a plate is fitted in the guide grooves 129. When the circuit cover portion 122 is placed onto the sensor connection member placement portion 124, the partition wall 130 is fitted into the guide grooves 129 to guide and place the first holder 120A onto the second holder 120B. An attachment hole 128a is formed in each flange 128 so as to penetrate the flange 128 to allow the sensor unit 10 to be attached to a housing (not depicted in the drawings) of an electric power steering system or the like.

As depicted in FIG. 8 and FIG. 11, the magnetic shield 140 is fitted over the outer peripheral surface of the ring portion 121 of the first holder 120A and the outer peripheral surface of the ring portion 123 of the second holder 120B. The magnetic shield 140 is formed of metal and, for example, shaped by curving a metal plate of steel such that the metal plate has a C-shaped section. The magnetic shield 140 is fitted over approximately half the length of the first holder 120A and the second holder 120B in the axial direction to block magnetism in a radial direction of the input shaft 111 and the output shaft 112. The magnetic shield 140 is formed to have an axial length slightly larger than a total axial length of the ring portion 121 of the first holder 120A and the ring portion 123 of the second holder 120B. With the engaging pawls 125a of the hooking protrusions 125 hooked on the axial end surface of the ring portion 121 of the first holder 120A, axially opposite ends of the magnetic shield 140 are in abutting contact with the flange pieces 121*b* of the ring portion 121 and the flange pieces 123*b* of the ring portion 123. The magnetic shield 140 is shaped like a flat plate at circumferentially opposite ends 140*a* of the magnetic shield 140, and recessed portions 142 for positioning are provided at respective axial ends of a circumferentially substantially central portion of an area of the magnetic shield 140 with the C-shaped section. The protrusion 121*a* of the ring portion 121 and the protrusion 123*a* of the ring portion 123 are fitted into the recessed portions 142 to position the magnetic shield 140 in the circumferential direction thereof with respect to the first holder 120A and the second holder 120B.

As depicted in FIG. 11, engaging grooves 150 are formed in areas of the first holder 120A that correspond to the ends 140*a* of the magnetic shield 140, that is, areas of the first holder 120A that are close to the Hall IC. For the engaging grooves 150 in the first holder 120A, in the circumferential direction of the ring portion 121, a side opposite to the Hall IC and a side closer to the second holder 120B are open, whereas a side closer to the Hall IC and the remaining part located on a side opposite to the second holder are closed.

As depicted in FIG. 11, engaging grooves 151 are formed in areas of the second holder 120B that correspond to the ends 140*a* of the magnetic shield 140, that is, areas of the second holder 120B that are close to the Hall IC. For the engaging grooves 151 in the second holder 120B, in the circumferential direction of the ring portion 123, a side opposite to the Hall IC and a side closer to the first holder 120A are open, whereas a side closer to the Hall IC and the remaining part located on a side opposite to first holder are closed.

As depicted in FIG. 11, the circumferential ends 140*a* of the magnetic shield 140 are inserted into the respective engaging grooves 150, 151. As depicted in FIG. 11, each of the ends 140*a* is provided with an engaging member 141*a* that is in abutting contact with an inner surface of the engaging groove 150 located closer to an axis in a radial direction of the ring portion 121 and an engaging member 141*b* that is in abutting contact with an inner surface of the engaging groove 151 located closer to the axis in a radial direction of the ring portion 123. The engaging members 141*a*, 141*b* are elastic and formed by cutting a portion of the magnetic shield 140 and raising the cut portion inward in the radial direction with respect to the ends 140*a* such that free ends of the engaging members 141*a*, 141*b* face each other. The engaging members 141*a*, 141*b* are elastically locked on the inner surfaces of the engaging grooves 150, 151.

The present embodiment can provide a torque detecting apparatus having the magnetism collecting module 118 including the sensor unit 10 with a redundant sensor or with no redundant sensor as described in the first embodiment. Regardless of whether or not a redundant sensor is included, the sizes and shapes of the members provided around the sensor unit 10 such as the sensor connection member placement portion 124 are prevented from varying. Thus, the design of these members need not be changed.

Now, a fourth embodiment of the sensor unit 10 will be described with reference to FIG. 13 and FIG. 14A. The present embodiment includes a redundant sensor.

Figure 13:
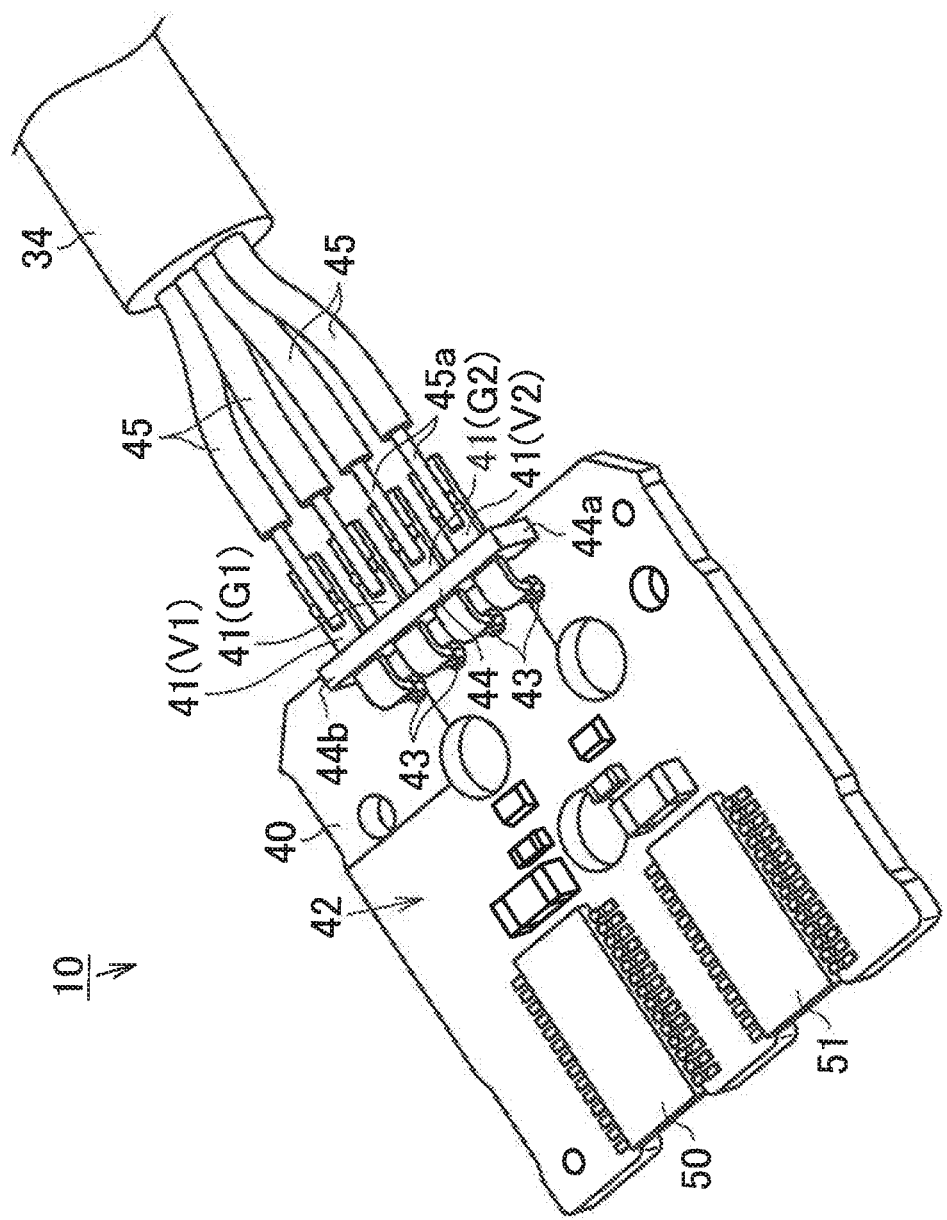
FIG. 13 is a perspective view of a redundant sensor unit in a fourth embodiment.

As depicted in FIG. 13, the sensor unit 10 in the present embodiment has a circuit board 40 (that is, a substrate) serving as a sensor connection member. The circuit board 40 is shaped generally like a rectangular plate and has Hall ICs 50, 51 fixedly arranged (that is, mounted) at a tip of the circuit board 40 in a width direction thereof. On a portion of a surface of the circuit board 40 located between the tip and a base end thereof, a predetermined circuit pattern 42 is provided that includes capacitors C21 to C24 and bi-directional Zener diodes ZD21, ZD22 illustrated in FIG. 14 as electronic components.

As depicted in FIG. 14A, in the circuit pattern 42, the Hall ICs 50, 51, the capacitors C21 to C24, and the bi-directional Zener diodes ZD21, ZD22 are electrically connected together. Some ports of the Hall ICs 50, 51 are connected to V1, G1, V2, G2. Areas of a circuit provided in the circuit board 40 that are connected to the above-described ports correspond to first connection portions. In FIG. 14A, V1 and G1 denote connection terminals for V1 and G1, and V2 and G2 denote connection terminals for V2 and G2 described below. In the present embodiment, G1 and G2 are electrically connected together, but G1 and G2 need not be connected together.

At a base end of the circuit board 40, a plurality of connection terminals 41 for connection to the harness 34 is arranged in juxtaposition in the width direction. The connection terminals 41 include terminals for V1 and G1 provided for the Hall IC 50 and terminals for V2 and G2 provided for the Hall IC 51. Each of the connection terminals 41 is folded into an L shape at a base end of the connection terminal 41 and fixedly inserted into a corresponding one of attachment holes 43 formed in the circuit board 40. Tip areas of the folded portions of the connection terminals 41 are arranged parallel to one another so as to extend in a length direction of the connection terminals 41. The connection terminals 41 correspond to second connection portions.

As depicted in FIG. 13, a holding member 44 formed of an insulating synthetic resin is attached to the circuit board 40. The holding member 44 has a U shape defined by a pair of leg portions 44*a* fixed to a flat surface of the circuit board 40 and a coupling portion 44*b* coupling the leg portions 44*a* together. The coupling portion 44*b* of the holding member 44 is provided with a plurality of holding portions not depicted in the drawings. The holding portions hold the respective connection terminals 41 to arrange the connection terminals 41 parallel to one another with each connection terminal 41 spaced from the adjacent connection terminal 41. The holding portions may hold the respective connection terminals 41 by, for example, fitting the connection terminals 41 into the respective holding portions formed as fitting grooves. However, the invention is not limited to this manner of holding the connection terminals 41.

As depicted in FIG. 13, a bare wire 45*a* formed by removing a cover from a covered wire 45 located at a terminal of the harness 34 is connected by welding to an area of each connection terminal 41 that extends from the coupling portion 44*b* toward a side opposite to the circuit board in the length direction of the connection terminal 41.

The sensor unit 10 configured as described above can be assembled, for example, into the magnetism collecting module 118 in the third embodiment, similarly and alternatively to the sensor unit 10 in the first embodiment.

Now, a variation with a non-redundant configuration will be described with reference to FIG. 14B and FIG. 15. The same components in FIG. 14B and FIG. 15 as the corresponding components in the embodiment with the redundant sensor are denoted by the same reference numerals and will not be described.

When no redundant Hall IC is provided, the Hall IC 51 is omitted as depicted in FIG. 15, the capacitors C23, C24 and the bi-directional Zener diode ZD21 are omitted as illustrated in FIG. 14B, and the covered wires 45 connected to the connection terminals 41 (G2), 41 (V2) are omitted. The rest of the configuration in the variation is similar to the corresponding part of the configuration in the embodiment with the redundant sensor. The above-described sensor unit 10 has only the single Hall IC 50 and is thus non-redundant.

The sensor unit 10 configured as described above can be assembled, for example, into the magnetism collecting module 118 in the third embodiment, similarly and alternatively to the sensor unit 10 in the first embodiment.

The embodiments of the invention are not limited to the above-described embodiments but may be varied as follows. The magnetic sensor is not limited to the Hall IC but may be another element such as a Hall element, a magneto-resistive element, or a magnetic impedance element. The sensor is not limited to the magnetic sensor but may be another sensor. For example, the magnetic sensor may be changed to an ultrasonic sensor, an optical sensor, or the like that measures a physical quantity such as the position of the detection object, a distance thereto, or the speed thereof.

In the third embodiment, the sensor unit 10 in the first embodiment is used for the magnetism collecting module 118. However, the sensor unit 10 in the second embodiment may be adopted instead of the sensor unit 10 in the first embodiment.

The arrangement of the sensors in the embodiment described with reference to FIG. 7 is an example in which no redundant sensor is provided. This arrangement is not limited to the non-redundant configuration. A pair of sensors (for example, Hall ICs) may be integrally formed using a mold, the two sensors may be electrically connected together as depicted in FIG. 6A, while the apparently single sensor may be arranged similarly to the Hall IC 24A in FIG. 7, thus providing a redundant sensor.

What is claimed is:

1. A sensor unit comprising:
   a sensor that detects a physical quantity related to a detection object;
   a sensor connection member having at least a first connection portion to which a lead to the sensor is connected and a second connection portion electrically connected to the first connection portion and electrically connected to an outside of the sensor unit; and
   an electronic component provided in a circuit between the first connection portion and the second connection portion, wherein
   the sensor connection member includes a plurality of the first connection portions and a plurality of the second connection portions so as to enable a plurality of the sensors to be attached to the sensor connection member, or plurality of the sensor connection members are provided according to a number of the sensors so as to enable the sensors to be attached to the sensor connection members,
   a lead to at least one of the sensors is connected to the sensor connection members,
   each of the plurality of first connection portions extends in a first direction extending along a length of the sensor connection member, and
   one of the plurality of first connection portions further extends in a second direction toward another one of the plurality of first connection portions, the second direction being along a width of the sensor connection member.

2. The sensor unit according to claim 1, wherein,
   the sensor connection member is a terminal formed of a conductive material, and
   the sensor connection member is provided according to the number of the sensors so as to enable the sensors to be attached to the sensor connection members.

3. The sensor unit according to claim 1, wherein,
   the sensor is mounted on a substrate serving as the sensor connection member, and
   the plurality of the first connection portions and the plurality of the second connection portions are provided on the substrate.

4. The sensor unit according to claim 2, wherein,
   the sensor is a Hall IC.

5. A magnetism collecting module comprising:
   the sensor unit according to claim 4;
   a magnetic circuit that guides an external magnetic flux to the sensor unit; and
   a holder that holds the sensor unit and the magnetic circuit.

6. A sensor apparatus that detects a torque, the sensor apparatus comprising:
   the magnetism collecting module according to claim 5;
   a torsion bar that is twisted in response to an applied torque;
   a cylindrical magnet magnetized to provide a plurality of pairs each of an N pole and an S pole arranged at regular intervals in a circumferential direction; and
   a yoke that guides a magnetic flux generated by the magnet to the magnetism collecting module.

* * * * *